United States Patent
Deonarine

(10) Patent No.: US 6,960,043 B2
(45) Date of Patent: Nov. 1, 2005

(54) METHOD AND APPARATUS TO EXTEND AND RETRACT A TEMPERATURE INDICATOR STICK

(75) Inventor: Victor I. Deonarine, Schaumberg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 316 days.

(21) Appl. No.: 09/682,780

(22) Filed: Oct. 18, 2001

(65) Prior Publication Data

US 2003/0077112 A1 Apr. 24, 2003

(51) Int. Cl.⁷ ................................................ G01K 7/06
(52) U.S. Cl. .................................... 403/109.4; 374/160
(58) Field of Search .......................... 403/109.4, 109.1, 403/109.2, 109.3, 109.5; 374/160

(56) References Cited

U.S. PATENT DOCUMENTS

| 4,875,782 A | * 10/1989 | Fox ............................. 374/148 |
| 4,887,625 A | * 12/1989 | Archer ......................... 135/75 |
| 4,962,765 A | * 10/1990 | Kung et al. .................. 600/549 |
| 5,668,306 A | *  9/1997 | Doherty ........................ 73/38 |

* cited by examiner

Primary Examiner—John R. Cottingham
(74) Attorney, Agent, or Firm—Ziolkowski Patent Solutions Group, SC

(57) ABSTRACT

An apparatus to reposition a temperature indicator stick for welding, metal fabrication, and heat treatment is disclosed. The apparatus includes a housing having an outer surface and an inner chamber to receive a temperature indicator stick therein. An advancement mechanism is positioned about the outer surface of the housing, and is capable of contact with a temperature indicator stick positioned in the chamber of the housing to advance the temperature indicator stick with motion applied to the advancement mechanism.

26 Claims, 2 Drawing Sheets

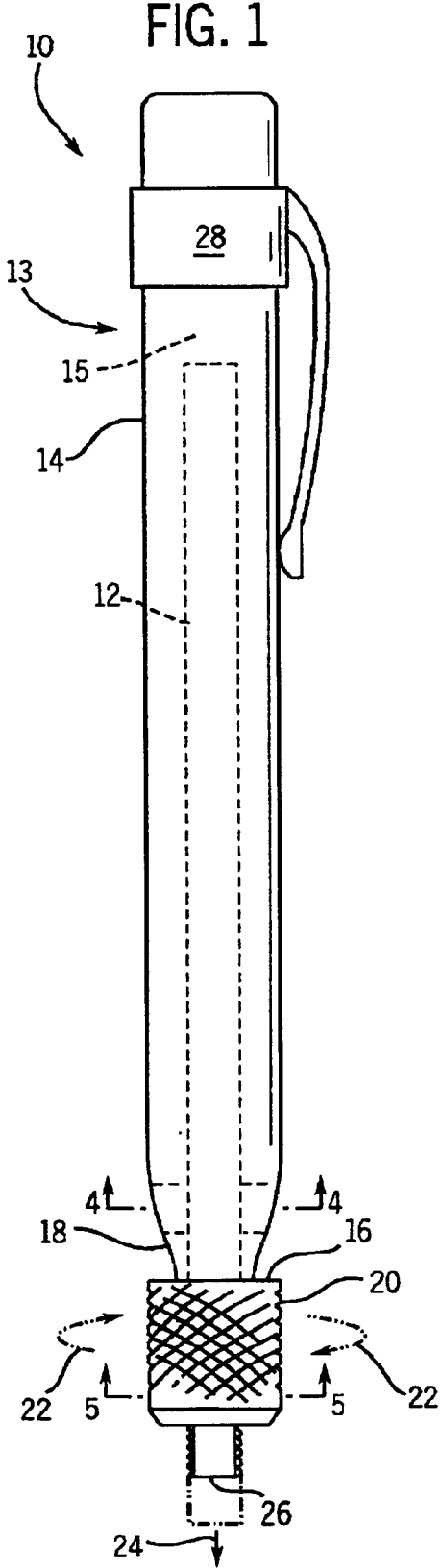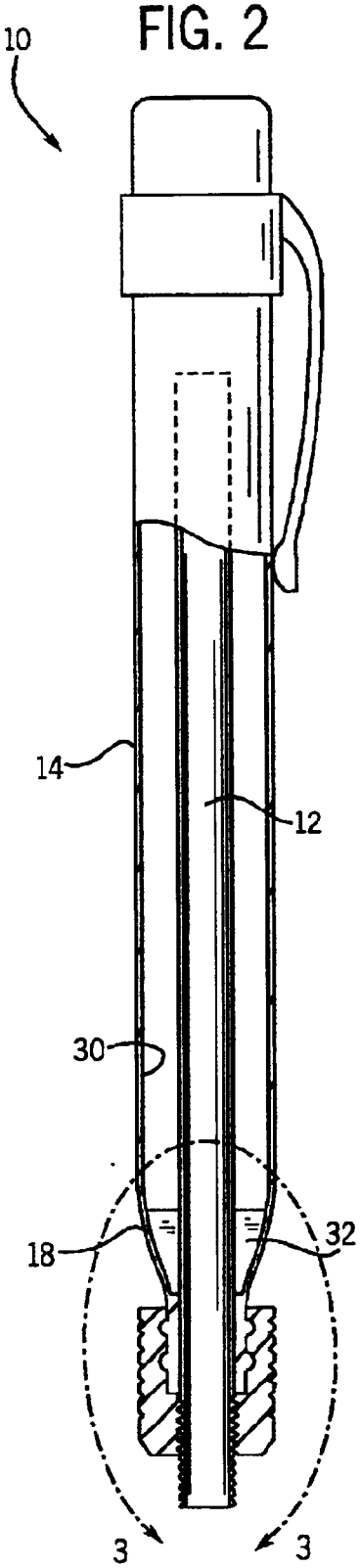

METHOD AND APPARATUS TO EXTEND AND RETRACT A TEMPERATURE INDICATOR STICK

BACKGROUND OF INVENTION

The present invention relates generally to temperature indicators, and more particularly, to an apparatus and method to extend and retract a temperature indictor stick.

Temperature indicators are well known in the welding, metal fabrication, and heat treatment industries. Such products are capable of determining surface temperatures during welding and metal fabrication processes. The products have also found use in heat-treatment processes, and can determine operating temperatures of mechanical, hydraulic, and electrical systems and components, such as transformers and motors.

Initially, temperature sensing was conducted by sprinkling a few granules of a known compound on an object. When the granules melted, the desired temperature was achieved. Later, pellets were introduced to make marks similar to a chalk mark on a surface of the object rather than observing the entire pellet melt. Further improvements led from a pellet to a chalk stick, which is protected in a housing that includes an adjustable holder for positioning the temperature indicator stick relative to the housing.

One known temperature indicator includes a housing having a rimmed end and a flanged end. A temperature indicator stick is inserted into the housing through the flanged end and prevented from leaving the housing by the rimmed end. The stick also has an outer casing or holder that is threaded into the housing and encloses the flanges.

The outer casing is tapered to constrict the flanges and lock the temperature indicator stick in a fixed position with a portion of the temperature indicator stick extending from the housing. Normal use of the temperature indicator stick by an operator causes a decrease in the portion of the temperature indicator stick extending from the housing, and eventually necessitates further advancement of the temperature indicator stick by the operator for continued temperature detection.

Problems exist with the current state of the art of temperature indicators. Existing holders for temperature indicators are not satisfactory. Such holders are often limited in their ability to fix the temperature indicator stick in position. When the stick is used by an operator, pressure exerted on the end of the stick during marking causes the stick to retract into the housing. Generally, the operator must unscrew the outer casing, reposition the temperature indicator stick, and then retighten the outer casing to continue marking objects. Other known methods of marking an object such as using the temperature indicator stick without a housing and holder are also unsatisfactory. Since the temperature indicator stick is fragile and clutched by the operator using a heat-resistant glove, the temperature indicator stick can be easily broken resulting in material waste. Furthermore, inscriptions on housings are useful to provide a particular temperature rating of the temperature indicator stick, which is critical to properly identifying the surface or operating temperatures of the object under evaluation.

There is a need for an apparatus and method capable of fixing a temperature indicator stick in position during the marking of objects for temperature detection. It would therefore be desirable to have a more efficient temperature indicator than current indicator configurations by coupling a collet having a threaded portion to a housing such that threads of the collet engage a temperature indicator stick.

BRIEF DESCRIPTION OF INVENTION

The present invention is directed to an apparatus and method to extend and retract a temperature indicator stick used to detect a temperature of an object to overcome the aforementioned concerns.

The present invention includes an apparatus that extends and retracts a temperature indicator stick configured to identify a particular temperature. In one embodiment, the apparatus includes a threaded collet rotatably secured to a housing and capable of moving the temperature indicator stick in an axial direction as threads of the collet contact the temperature indicator stick. Flanges within the housing are also used to further limit movement of the temperature indicator stick.

In accordance with one aspect of the present invention, an apparatus to reposition a temperature indicator stick is disclosed and includes a housing having an outer surface and an inner chamber to receive a temperature indicator stick therein. The apparatus also includes an advancement mechanism positioned about the outer surface of the housing and capable of contact with a temperature indicator stick positioned in the chamber of the housing to advance the temperature indicator stick with motion applied to the advancement mechanism.

In accordance with another aspect of the present invention, a temperature indicator stick extension and retraction apparatus includes a means for aligning a temperature indicator stick to permit axial movement. The apparatus further includes a means for controlling axial movement of the temperature indicator stick to extend and retract the temperature indicator stick.

In a further aspect of the present invention, an apparatus to extend and retract a temperature indicator stick includes a housing having at least one annular ring at one end and adapted to receive within the housing a temperature indicator stick. The apparatus also has a resistance mechanism secured to the housing to oppose rotational movement of the temperature indicator stick. Additionally, the apparatus includes a collet having threads and rotatably coupled to the at least one annular ring of the housing, the collet configured to engage the temperature indicator stick upon rotation of the collet about the housing.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 1 is a side, elevational view of an apparatus to extend and retract a temperature indicator stick in accordance with the present invention.

FIG. 2 is a partial cross-sectional view of the apparatus of FIG. 1.

DETAILED DESCRIPTION

Figure 3:
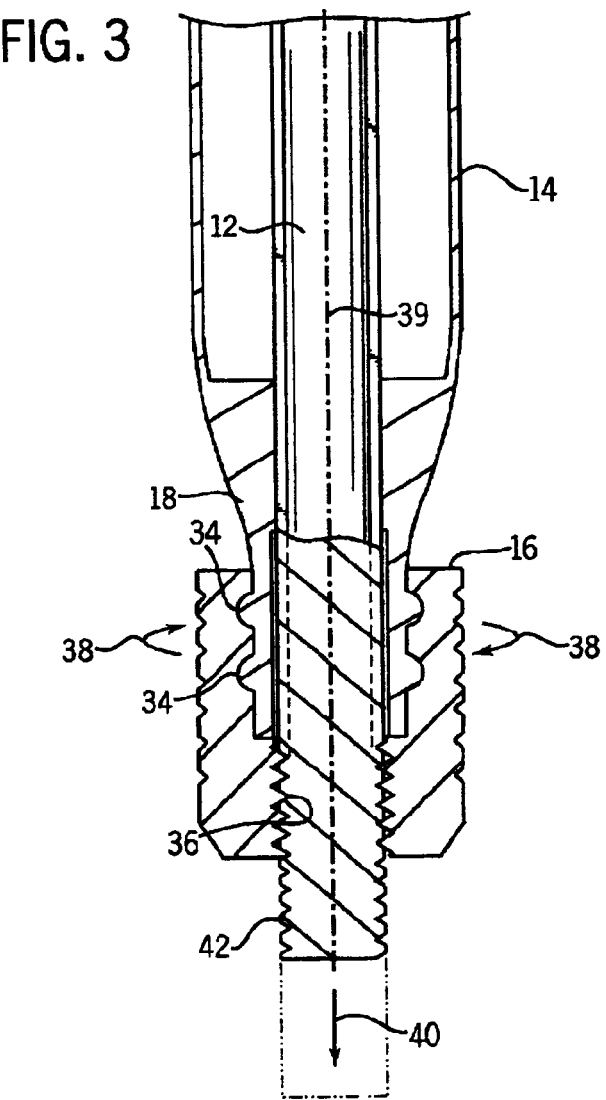
FIG. 3 is a detailed view of a portion of FIG. 2 taken along line 3—3 of FIG. 2.

Various temperature detection monitors are used by the welding, metal fabrication and heat treatment industries to measure temperatures of materials. Determining surface temperatures is critical during welding and metal fabrication processes, such as pre-heat and post-weld heat treatment. Temperature monitoring is also important for determining operating temperatures of various mechanical, electrical, and hydraulic systems and components. These components, such as a transformer, can be destroyed or alternatively have their device characteristics substantially altered if the components are not manufactured within a specified temperature range.

Several detection devices and methods exist to determine surface and operating temperatures. Some devices use gauges or electronic components having thermistors, whereas others use chemical compounds formed as temperature indicator sticks that feed through mechanical temperature indicators. Although each of these detection devices has advantages, temperature indicators have been found to be particularly useful due to their ease of use and inexpensive cost.

Referring now to FIG. 1, one embodiment of an apparatus 10 to reposition a temperature indicator stick 12 is shown. The temperature indicator stick is rated to measure a specified temperature, which is commonly marked on an outer or exterior surface 13 of a housing 14 having an inner chamber 15 to receive a temperature indicator stick 12 therein. Often, a kit is provided containing a series of temperature indicator sticks having different temperature ranges along with the apparatus 10. Often, the housing 14 is formed of a lightweight material, such as aluminum. An advancement mechanism 16 is positioned about the outer surface 13 of the housing 14 and is capable of contact with a temperature indicator stick 12 positioned in the chamber 15 of the housing 14 to advance the temperature indicator stick 12 with motion applied to the advancement mechanism or transducer 16. In a preferred embodiment, the advancement mechanism 16 is a rotatable collet that connects or mounts to a tapered end 18 of the housing 14 and has finger grips 20 to facilitate collet rotation. Rotational motion applied to the collet 16 by hand or other means in the direction of arrows 22 (clockwise) causes the temperature indicator stick 12 to linearly reposition or move in a direction of arrows 24 to permit use of an end 26 of the temperature indicator stick 12 for marking objects. In use, an operator can rotate the collet 16 with a single motion, such as one turn, or as desired to extend the temperature indicator stick 12 out of the housing 14. If the operator rotates the collet 16 in the reverse direction, opposite to arrow 22, then the temperature indicator stick 12 retracts into the housing 14 in a direction opposite to arrow 24. Such a design of the housing 14 and advancement mechanism 16 provides a means for inserting replacement temperature indicator sticks into the inner chamber 15 of the apparatus 10. That is, a first temperature indicator stick rated at a specified temperature may be replaced by a second temperature indicator stick rated at the same specified temperature or a different temperature. The apparatus can also include a pocket clip 28 configured to be adjustable along the housing 14 that permits attachment of the apparatus 10 to clothing apparel.

FIG. 2 is a cross-sectional view of the temperature indicator or apparatus 10. An interior surface 30 of the housing 14 has a series of flanges 32 secured thereto and extending therefrom that encircle the temperature indicator stick 12. The flanges or resistance mechanism 32 opposes rotational movement of the temperature indicator stick 12 in the direction shown by arrow 22 of FIG. 1 as well as the reverse rotational direction.

Referring now to FIG. 3, a detailed view of a portion of FIG. 2 taken along line 3-3 of FIG. 2 shows the housing 14 having a pair of annular rings 34. The collet 16 is coupled to the pair of annular rings 34 permitting rotation of the collet 16 about the housing 14. The advancement mechanism or collet 16 has one or more threads 36 that engages the temperature indicator stick 12 as the collet 16 rotates in a clockwise direction 38. Rotation of the collet 16 in the direction of arrows 38 causes the temperature indicator stick 12 to extend from the housing 14 along a generally longitudinal axis 39 in the direction of arrow 40. During rotation, the threads 36 of the collet 16 cause the temperature indicator stick 12 to be threaded along at least a portion of an outer surface 42. Collet threads 36 prevent movement of the temperature indicator stick 12 in a direction opposite to arrow 40 unless the collet 16 is rotated in a reverse direction, that is, opposite to arrows 38. Preferably, the inner chamber 15 is directed along the generally longitudinal axis 39 to receive a temperature indicator stick 12 therein. In alternative embodiments, the contoured end 18 of the housing 14 may include a single annular ring 34 connectable to the advancement mechanism 16 or more than two annular rings. Alternatively, the advancement mechanism 16 can be rotatably fixed to the housing 14.

Figure 4:
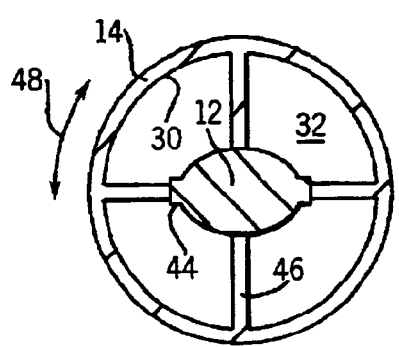
FIG. 4 is a cross-sectional view taken along line 4—4 of FIG. 1.

FIG. 4 is a cross-sectional view taken along line 4—4 of FIG. 1. Flanges 32 connect to the interior surface 30 of the housing 14. The temperature indicator stick 12 is aligned by each of the flanges 32 along axis 39, and has a generally oval shape. The temperature indicator stick 12 further includes a pair of ridges 44 that engage a side edge 46 of the flanges 32 to oppose or prevent rotational movement of the temperature indicator stick 12 in a direction of arrows 48. The contoured housing 14 assists in aligning the collet 16 with the ridges 44 of the temperature indicator stick 12. Additionally, the alignment of the temperature indicator stick 12 along axis 39 permits engagement between the ridges 44 and the threaded member or collet 16.

Figure 5:
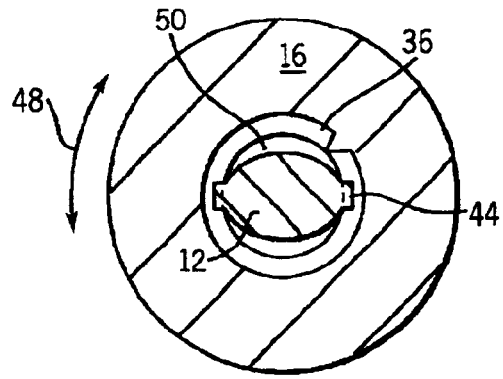
FIG. 5 is a cross-sectional view taken along line 5—5 of FIG. 1.

FIG. 5 is a cross-sectional view of the temperature indicator stick 12 partially threaded and is taken along line 5—5 of FIG. 1. Rotation of the collet 16 in the direction of arrows 48 causes the collet threads 36 to engage the ridge 44 of the temperature indicator stick 12, which results in extension or retraction of the temperature indicator stick 12. During the threading process, residue of the temperature indicator stick 12 is removed and deposited into a volume of space or air pocket 50. Preferably, the temperature indicator stick 12 has two ridges 44 and is oval-shaped to provide space 50 for temperature indicator stick residue. In one embodiment, the threads 36 are configured to engage only the ridges 44 to create less temperature indicator stick residue. Other embodiments are also contemplated wherein the temperature indicator stick 12 has other non-circular shapes and are within the scope of the present invention.

In accordance with one aspect of the present invention, an apparatus to reposition a temperature indicator stick is disclosed. The apparatus includes a housing having an outer surface and an inner chamber to receive a temperature indicator stick therein. The apparatus also includes an advancement mechanism positioned about the outer surface of the housing. The advancement mechanism is capable of contact with a temperature indicator stick positioned in the chamber of the housing. The advancement mechanism is also capable of advancing the temperature indicator stick with motion applied to the advancement mechanism.

In accordance with another aspect of the present invention, a temperature indicator stick extension and retraction apparatus includes a means for aligning a temperature indicator stick to permit axial movement, such as a housing having a tapered end. The apparatus further includes a means for controlling axial movement of the temperature indicator stick to extend and retract the temperature indicator stick. In one embodiment, the means for controlling axial movement includes a rotatable collet capable of being turned by hand to extend or retract the temperature indicator stick.

In yet another aspect of the present invention, an apparatus to extend and retract a temperature indicator stick configured to measure a particular temperature includes a housing having at least one annular ring at one end and adapted to receive within the housing a temperature indicator stick. The apparatus also has a resistance mechanism, such as flanges, secured to the housing to oppose rotational movement of the temperature indicator stick. Additionally, the apparatus includes a collet having threads and rotatably coupled to the at least one annular ring of the housing. The collet is configured to engage the temperature indicator stick upon hand or other rotation of the collet about the housing.

In a further aspect of the present invention, an apparatus to reposition a temperature indicator stick comprises a housing having an inner chamber directed along a generally longitudinal axis to receive a temperature indicator stick therein and a transducer which is mounted to the housing and rotatable about the generally longitudinal axis, the transducer engaging the temperature indicator stick to convert such rotatable motion to linear repositioning of the temperature indicator stick along the generally longitudinal axis.

In another aspect of the present invention, a kit to reposition a temperature indicator stick, the kit comprising a housing having an inner chamber to receive a first indicator stick, the first indicator stick being shortened in normal use and an advancement mechanism proximate to the housing. The advancement mechanism is capable of contact with the first temperature indicator stick positioned in the inner chamber of the housing to advance the first temperature indicator stick with motion applied to the advancement mechanism. The kit also has a second indicator stick which may replace the first indicator stick in the inner chamber.

In a final aspect of the present invention, an apparatus to reposition a temperature indicator stick comprises a housing having an inner chamber to receive a temperature indicator stick therein and a means for advancing the temperature indicator stick by a rotating motion about the housing.

The present invention has been described in terms of the preferred embodiment, and it is recognized that equivalents, alternatives, and modifications, aside from those expressly stated, are possible and within the scope of the appending claims.

What is claimed is:

1. An apparatus to reposition a temperature indicator stick, the apparatus comprising:
   a housing having an outer surface and an inner chamber to receive a temperature indicator stick therein; and
   an advancement mechanism positioned about the outer surface of the housing and capable of contact with a temperature indicator stick positioned in the chamber of the housing to advance the temperature indicator stick with motion applied to the advancement mechanism.

2. The apparatus of claim 1 further including a resistance mechanism configured to prevent rotation of the temperature indicator stick.

3. The apparatus of claim 1 wherein the advancement mechanism advances the temperature indicator stick one of into the housing and out of the housing.

4. The apparatus of claim 1 wherein rotatable motion applied to the advancement mechanism advances the temperature indicator stick.

5. The apparatus of claim 1 wherein the temperature indicator stick has at least one ridge configured to engage the advancement mechanism.

6. The apparatus of claim 1 wherein the advancement mechanism has one or more threads.

7. The apparatus of claim 6 wherein the housing has a tapered end to align the temperature indicator stick with the one or more threads.

8. The apparatus of claim 1 wherein the advancement mechanism is rotatably fixed to the housing.

9. The apparatus of claim 1 wherein the advancement mechanism is a collet having threads.

10. A temperature indicator stick extension and retraction apparatus comprising:
    means for aligning a temperature indicator stick to permit axial movement; and
    means for controlling axial movement of the temperature indicator stick to extend and retract the temperature indicator stick.

11. The apparatus of claim 10 further comprising a means far preventing rotational movement of the temperature indicator stick during the axial movement.

12. The apparatus of claim 11 wherein the means for preventing rotational movement is a plurality of flanges configured to engage a ridge of the temperature indicator stick.

13. The apparatus of claim 10 further comprising a means for accumulating residue of the temperature indicator stick upon axial movement of the temperature indicator stick.

14. The apparatus of claim 13 wherein the means for accumulating residue comprises forming the temperature indicator stick in a non-circular shape to have a volume of space in the means for controlling movement of the temperature indicator stick.

15. The apparatus of claim 10 wherein the means for controlling movement of the temperature indicator stick includes a rotatable collet having a threaded portion configured to engage the temperature indicator stick.

16. The apparatus of claim 15 wherein the means for controlling allows extension and retraction of the temperature indicator stick with a single motion.

17. The apparatus of claim 10 wherein the means for aligning a temperature indicator stick includes a housing having an outer surface and an inner chamber to receive a temperature indictor stick therein.

18. An apparatus to extend and retract a temperature indicator stick, the apparatus comprising:
    a housing having at least one annular ring at one end and adapted to receive within the housing a temperature indicator stick;
    a resistance mechanism secured to the housing to oppose rotational movement of the temperature indicator stick; and
    a collet having threads and rotatably coupled to the at least one annular ring of the housing, the collet configured to engage the temperature indicator stick upon rotation of the collet about the housing.

19. The apparatus of claim 18 wherein a pair of annular rings couples the collet to the housing.

20. The apparatus of claim 18 wherein the resistance mechanism includes a series of flanges connected to an interior of the housing.

21. The apparatus of claim 18 wherein the temperature indicator stick has at least one ridge configured to engage the threads upon rotation of the collet to cause one of extension and retraction of the temperature indicator stick from the housing.

22. The apparatus of claim 21 wherein the housing is contoured at one end to align the threads of the collet with the at least one ridge of the temperature indicator stick.

23. The apparatus of claim 18 wherein the temperature indicator stick is ovally shaped.

24. An apparatus to reposition a temperature indicator stick, the apparatus comprising:
- a housing having an inner chamber directed along a generally longitudinal axis to receive a temperature indicator stick therein; and
- a transducer which is mounted to the housing and rotatable about the generally longitudinal axis, the transducer engaging the temperature indicator stick to convert such rotatable motion to linear repositioning of the temperature indicator stick along the generally longitudinal axis.

25. A kit to reposition a temperature indicator stick, the kit comprising:
- a housing having an inner chamber to receive a first indicator stick, the first indicator stick being shortened in normal use;
- an advancement mechanism proximate to the housing and capable of contact with the first temperature indicator stick positioned in the inner chamber of the housing to advance the first temperature indicator stick with motion applied to the advancement mechanism; and
- a second indicator stick which may replace the first indicator stick in the inner chamber.

26. An apparatus to reposition a temperature indicator stick, the apparatus comprising:
- a housing having an inner chamber to receive a temperature indicator stick therein; and
- means for advancing the temperature indicator stick by a rotating motion about the housing.

* * * * *

UNITED STATES PATENT AND TRADEMARK OFFICE
CERTIFICATE OF CORRECTION

PATENT NO. : 6,960,043 B2
DATED : November 1, 2005
INVENTOR(S) : Deonarine

It is certified that error appears in the above-identified patent and that said Letters Patent is hereby corrected as shown below:

<u>Column 6,</u>
Line 21, delete "far" and substitute -- for --.

Signed and Sealed this

Seventh Day of February, 2006

JON W. DUDAS
*Director of the United States Patent and Trademark Office*